United States Patent
Einarsson

Patent Number: 5,559,623
Date of Patent: Sep. 24, 1996

[54] METHOD AND ARRANGEMENT FOR ARRANGING AN INTERCEPTION-PROOF OPTICAL LINK

[75] Inventor: Göran Einarsson, Nacka, Sweden

[73] Assignee: Telia AB, Farsta, Sweden

[21] Appl. No.: 242,850

[22] Filed: May 16, 1994

[30] Foreign Application Priority Data

May 18, 1993 [SE] Sweden .................. 9301710

[51] Int. Cl.$^6$ ................................. H04B 10/00
[52] U.S. Cl. ..................... 359/112; 359/173; 371/32; 340/555
[58] Field of Search ................. 359/112, 173, 359/184, 185; 371/32, 33; 340/555

[56] References Cited

U.S. PATENT DOCUMENTS

| | | | |
|---|---|---|---|
| 4,166,212 | 8/1979 | Judeinstein | 250/199 |
| 4,217,488 | 8/1980 | Hubbard | 359/112 |
| 4,435,850 | 3/1984 | Bowen et al. | 359/112 |
| 4,616,898 | 10/1986 | Hicks, Jr. | 350/96.15 |
| 4,636,029 | 1/1987 | Johansson et al. | 359/112 |
| 4,648,133 | 3/1987 | Vilnrotter | 359/186 |
| 5,165,091 | 11/1992 | Lape et al. | 370/79 |
| 5,265,103 | 11/1993 | Brightwell | 371/32 |
| 5,349,458 | 9/1994 | Karlsson | 359/112 |

FOREIGN PATENT DOCUMENTS

| | | | |
|---|---|---|---|
| 0102815 | 3/1984 | European Pat. Off. | |
| 2060869 | 5/1981 | United Kingdom | 359/112 |

Primary Examiner—Leo Boudreau
Assistant Examiner—Rafael Bacares
Attorney, Agent, or Firm—Oblon, Spivak, McClelland, Maier, & Neustadt, P.C.

[57] ABSTRACT

A communication method and system for securely communicating between a first station and a second station over an optical link. Information is transmitted from the first station in a pulse position modulation (PPM) form which has a high proportion of noise in order to reduce a possibility of unauthorized tapping of the signal from the optical link. The transmitted information may contain error coding so that the receiver can detect if an error occurred in transmission. If an error is detected, the second station can request the first station to retransmit the erroneously received information.

4 Claims, 2 Drawing Sheets

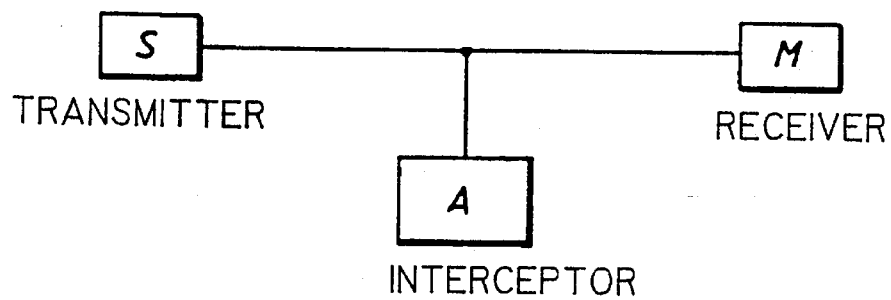
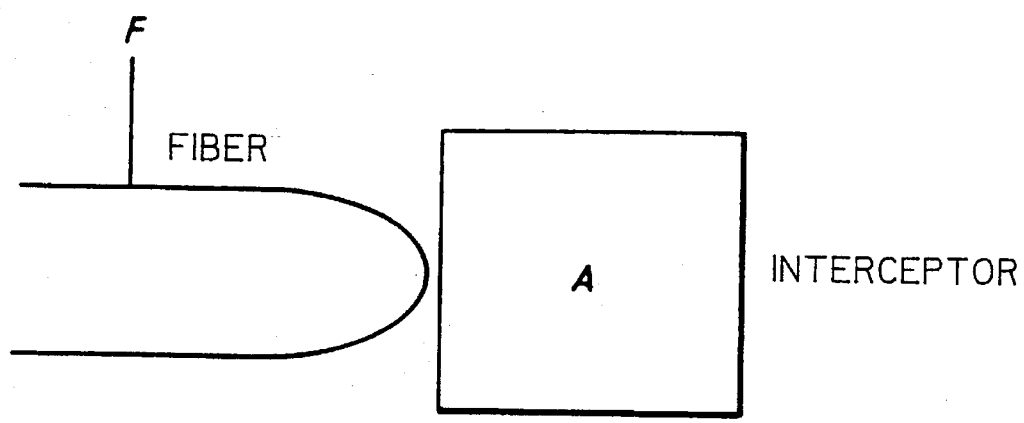

METHOD AND ARRANGEMENT FOR ARRANGING AN INTERCEPTION-PROOF OPTICAL LINK

TECHNICAL FIELD

The invention relates to optical transmission systems with associated optical links.

PRIOR ART

Tapping of information from connections in different forms of communications networks is a well known problem. Electrical connections radiate magnetic and electrical fields which can be tapped by different means. Optical connections have the advantage that no magnetic and electrical fields which can be recorded occur outside an optical fibre.

In principle, however, an optical connection can be tapped by bending the optical fibre which is utilized for the transmission. Bending results in light in the fibre leaking out, by means of which tapping of information is made possible. In a normal optical transmission link it is necessary for only a small proportion of the light to be tapped in order to achieve unauthorized interception. In British Patent 2060869 and U.S. Pat. No. 4,435,850, the utilization of shot noise for rendering any tapping more difficult and increasing the possibility of discovering said interception is described. The documents describe the application of the shot noise method, on application of the on/off method, for reducing the possibility of illegal tapping of information from an optical fibre.

It is also known to utilize pulse position modulation (PPM) as a modulation method in the transmission of information. However, the method has not been suitable for increasing security against unauthorized interception in an optical link.

Furthermore, an error-detecting code in combination with automatic repeat request is utilized for obtaining a digital link with few transmission errors. This method has not been interconnected with the possibility of increasing the security on an optical link.

Utilization of pulse position modulation is described in, among others, Patent Specifications EP 2102815, EP 102815 and U.S. Pat. No. 4,306,314. Each pulse is located in one of a number of time slots and represents a group of digits. The documents thus provide proposals for more effective utilization of accessible channels in an optical fibre. The question of secrecy in connection with the risks of unauthorized tapping of information from a fibre is not dealt with in the said documents.

To render interception more difficult, encryption of the transmitted signal is used. For encryption to be effective, keys are required which will be handled in a certain manner by the transmitter and receiver. Utilization of encryption and handling of keys in this connection is complicated and requires special equipment for transmitting and receiving. A number of forms of encryption are described in different documents.

DESCRIPTION OF THE INVENTION

Technical Problem

There is a need for producing an interception-proof link. There is also a requirement that any interception or attempt at interception will be discovered. To accomplish this, the receiver end, with suitable detection, must be able to determine if unauthorized tapping is occurring on the connection or not. If unauthorized tapping is occurring, the received power will be reduced, for example, by such an amount that this is discovered by the receiver.

Those who want to intercept a connection in an unauthorized manner will be forced to take out such a large proportion of the energy of the signal that the interception is discovered with great probability.

To carry out tapping from an optical link for an unauthorized purpose should also be associated with great technical and economic expenditure.

Encryption of information presupposes that a transmitter and receiver have agreed on the code which will be used. For this to be effective, keys and changing of the codes within, for example, certain time frames is required. The methods using encryption presuppose normal sophisticated equipment at the transmitter and receiver ends. There is thus a requirement that security against interception can be achieved without expensive encryption equipment having to be utilized.

The present invention aims to solve these problems.

The Solution

The present invention relates to a method for producing an interception-proof transmission between a transmitter and a receiver via an optical connection. The method is characterized by the fact that a signal with a high proportion of optical noise, shot noise, is generated. To increase security further, the signal is modulated in accordance with the pulse position modulation (PPM) method. An unauthorized receiver which connects itself to the connection is assumed to do this by tapping light out of the link. This is done, for example, by the glass fibre which is contained in the link being bent considerably, as a result of which light leaks out of the fibre. The unauthorized party then attempts to decode the information in the tapped light. Due to the fact that the signal contains a large proportion of optical noise in combination with PPM modulation, a large part of the light in the fibre must be taken out for it to be possible to interpret the signal. A suitably selected signal/noise ratio means that the proportion of light which is taken out of the fibre by an unauthorized party is high if the information is to be interpretable. If large amounts of light are taken out of a connection, this can be detected at the receiver end in specially arranged monitoring elements. In the receiver, monitoring equipment is arranged which, for example, monitors the received optical power. If information is tapped out of the system, the optical power will be changed. The monitoring equipment then registers that a change beyond acceptable limits has taken place and outputs an alarm. Measures with respect to whatever occurred are then taken.

In a development of the method, the signal transmission is combined with error-correcting and error-detecting coding in combination with automatic repeat request (ARQ). In this case, a return channel is arranged in which the receiver transfers the automatic repeat request to the transmitter. This makes it possible to use different wavelengths for the channels, which makes it more difficult for an unauthorized interceptor to interpret information. If the return channel is arranged in another fibre or another cable connection, this provides further difficulties to taking any information out of the connection. With automatic repeat request, the possibility of receiving the information correctly at the receiver is increased. An unauthorized interceptor cannot request retransmission without the interception being discovered.

The arrangement comprises a transmitter and a receiver, and a communications link between them. The transmitter is provided with a transmitting element. The transmitting element transmits information in the form of an optical signal. The optical signal is provided with a high proportion of optical noise. The optical noise supplied in the system dominates over other noise sources, for example thermal noise in the receiver. The transmitter also orders the information in the information channel in accordance with the pulse position modulation method. Since, in this case, each pulse corresponds to different representations, see FIG. 5, the party tapping the information must know the code utilized. If the code is known, it must also be known how the information has been built up and where the pulses begin and end.

If the signal is tapped by someone who is not authorized to do so, a detectable quantity of light will thus disappear from the link. This will be detected by detecting elements at the receiver end. If no special elements have been arranged for detection, the intervention will be noticed by an increase in the proportion of faulty or uninterpretable received information sections. Measures can then be taken for preventing further tapping of information out of the system.

In a further development of the invention, error-detecting codes with automatic repeat request (ARQ) are utilized. By allowing transmitter and receiver to communicate with one another, the receiver can request retransmission of faulty received information. Since an unauthorized interceptor cannot request retransmission of lost information without being discovered, he must use error correction. If a suitable signal/noise ratio is selected, the probability of correctly received information becomes low, and the possibility of correcting the information becomes low or non-existent.

Advantages

The present invention is simple to apply in existing and future optical systems.

Unauthorized interception requires that a relatively large amount of energy must be taken out of the connection. This means that the receiver can detect that interception is occurring.

Unauthorized interception results in the power of the signal being changed, which significantly increases the probability of detection.

The possibility of detecting and correctly interpreting the information is reduced, in unauthorized tappings out of the fibre link, by utilizing PPM modulation.

Further enhancement of the security against unauthorized interception is obtained if error-detecting codes and automatic repeat request are utilized.

Since the invention does not presuppose special arrangements which are connected to the network, the investments are low.

DESCRIPTION OF THE FIGURES

FIG. 1 shows a transmission link with transmitter S and receiver M, and an interceptor A coupled to the system.

FIG. 2 shows a fibre F which has been bent, whereby light is detected by an interceptor A.

PREFERRED EMBODIMENT

In the text which follows, the concept of the invention is described with reference to the figures and designations therein. The invention relates to a method and an arrangement for establishing interception-proof optical links.

The invention combines pulse position modulation, PPM, with the signal being given a high degree of optical noise, shot noise. This entails, on the one hand, that a minimum amount of light must be taken out of the connection and, on the other hand, that a selected code according to PPM must be known for the tapped information to be interpretable.

The fact that a large part of the energy must be tapped out means that the probability of useful information being tapped out of the system is very low. If sufficient energy is taken out of the system for ensuring correct detection, detection elements in the receiver detect that energy has disappeared during the transmission. If the receiver lacks such equipment, the probability of incorrectly received information is increased, as a result of which the interception is exposed.

In the text below, a system with transmitter and receiver and a communication link between them according to FIG. 1 is considered.

Figure 3:
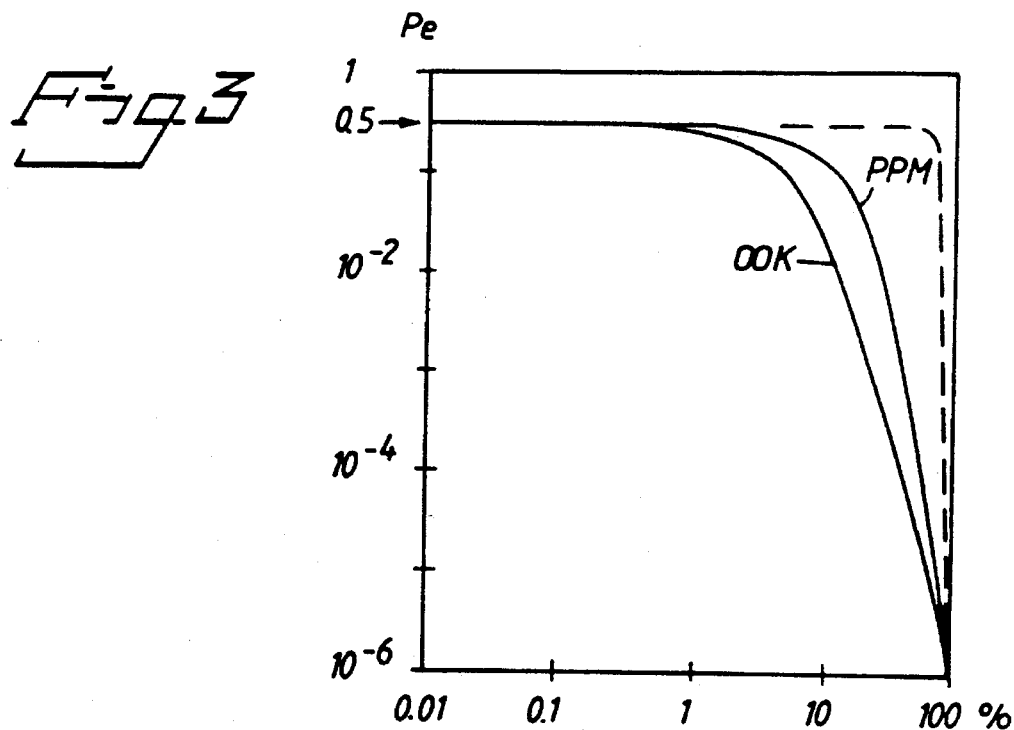
FIG. 3 shows a characteristic of an optical receiver.
Figure 4:
FIG. 4 shows on/off modulation of conventional type.
Figure 5:
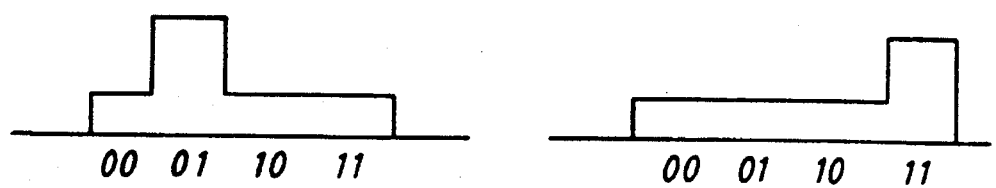
FIG. 5 shows the principle of pulse position modulation.

The information is transmitted from the transmitter in digital form. The information can be transferred according to various known principles. FIGS. 4 and 5 show examples of different principles of representation of information. Other representations are possible, but in the text below, the invention is described with utilization of the representation with PPM modulation specified in FIG. 5. The representation relates to pulse position modulation (PPM). During each transmission, n binary digits are transferred due to the fact that the pulse can occur in $2^n$ different positions in the signal interval. In the example in FIG. 5, n=2, which requires $2^2$=4 pulse positions according to the figure. The security in the system is increased by n and the ideal (dashed) curve in FIG. 3 is approached with a large n. The system then has absolute security against tapping. However, a system with a large n is complicated to achieve. In practice, n should be selected in such a manner that an adequate degree of security is obtained.

FIG. 3 shows the probability of transmission errors in relation to how large a part of the signal power is utilized. The dashed line specifies an ideal state in which protection against unauthorized interception is very high. The remaining curves show corresponding characteristics with respect to PPM and conventional modulation, respectively.

In the event that someone wishes to intercept the connection, he connects himself at some point between the transmitter and receiver. The interceptor has been indicated by A in FIG. 1. To get at the information, an unauthorized interceptor takes measures for tapping the light out of the fibre in question. This is done, for example, by bending the fibre according to FIG. 2 substantially, as a result of which light leaks out. The interceptor then arranges elements which sense the light and convert it into interpretable information. So that the interceptor will be not be discovered, the quantities of the energy content in the signal drained out of the system should not be such that the normal functions of the system are endangered. Furthermore, the energy tapping must be so low that any detection arrangements in the system do not register the tapping.

The optical noise is selected to be so strong that it dominates over other noise sources, such as thermal noise in the receiver and so forth.

The number of time slots which is used in PPM is also related to the possibility of detecting meaningful information.

The security against interception can be strengthened if a return channel is accessible between receiver and transmitter by combining PPM with ARQ (automatic repeat request). ARQ is a technique which is well known in another connection and is described in S. Lin and D. J. Costello "Error Control Coding" Prentice-Hall 1983. In the said document, the mathematical relationships are specified which can be utilized for calculating error probabilities. Our mathematical descriptions which follow are based on a system with error detection and automatic repeat requests.

In this case, the receiver detects received signals and determines if the reception was correct. On indication that the information- has not been received correctly, an automatic repeat request is sent to the transmitter about correcting or retransmitting the current section. Due to the fact that PPM is used, the interceptor has little possibility of correctly interpreting the transferred information. In contrast to the legal user, he cannot request retransmission of a message which has been detected as faulty. Such an automatic repeat request from someone who is intercepting the connection in an unauthorized manner would inevitably reveal that an illegal activity is taking place. The party intercepting the connection will be able to tap information which is transmitted on the return channel provided the frequency of the return channel is known. If the return channel is transmitted on an optical fibre other than the one for information from the transmitter, such interception is rendered more difficult.

However, the interceptor derives little benefit from attempting to intercept the return channel. This only contains the request for retransmission by the receiver. All information which needs to be protected is transmitted via the main connection.

In a system with error detection and automatic repeat request (ARQ system), it holds true with good accuracy that $$P(E) \leq [1-(1-p)^n]2^{-(n-k)}$$

where n is the code length, n–k is the number of parity bits in the code, and p is the bit error probability for transmission without coding.

Since an unauthorized interceptor cannot request automatic repeat of information which has been detected as being faulty, error correction must be carried out. However, this is less effective, especially as the probability of receiving errors is high at the interceptor end.

The following case is considered as an example of how the method operates.

The signal/noise ratio is selected in such a manner that transmission without coding provides an error probability of $P=10^{-6}$. A so-called BCH code with n=1023 and n–k=30 is used as coding. A maximum of 3 incorrectly received symbols can be corrected with this code.

According to the formula above, the error probability at the legal receiver end is $$P(E)=[1-(1-10^{-6})^{1023}]2^{-30}=10^{-12}$$

With PPM modulation, it is easily obtained that an unauthorized tapping of 10% results in a probability of transmission errors corresponding to p=0.1, compare FIG. 3. This provides $$P(C) = \sum_{i=0}^{3} \binom{1023}{i} (0.1)^i (1-0.1)^{1023-i}$$

$$=3.8 \cdot 10^{-42}.$$

P(C) is the probability that the interceptor will be able to gain information out of the tapped signal, and the possibility is non-existent with such small values of P(C).

The invention thus provides a very high security against unauthorized interception.

The invention is not limited to the embodiment shown above but can undergo modifications within the scope of the patent claims which follow and the concept of the invention.

I claim:

1. A method of securely communicating over an optical link between a first station and a second station, comprising the steps of:

transmitting a pulse position modulated signal from the first station to the second station over the optical link, the transmitted signal having a high proportion of noise in order to reduce a possibility of an unauthorized tapping of the pulse position modulated signal from the optical link; and receiving by the second station the pulse position modulated signal transmitted by the first station, wherein an error probability at the second station which is a legal receiver is $$P(E) \leq [1-(1-p)^n]2^{-(n-k)},$$

where p is a bit error probability, n is a code length, and n–k is a number of parity bits in the code, and wherein a probability that an unauthorized receiver will be able to obtain information out of a tapped signal is $$P(C) = \sum_{i=0}^{j} \binom{n}{i} (e)^i (1-e)^{n-i}$$

where j is a maximum number of incorrectly received symbols which can be corrected using coding and e is a probability of errors in transmission for the unauthorized receiver.

2. A method according to claim 1, wherein:

the transmitting step includes coding information to be transmitted; and the receiving step includes decoding the coded information to determine if the information is properly received and requesting the first station to retransmit the information when the information is not properly received.

3. A secure communication system, comprising:

a first station including a transmitter which transmits a pulse position modulated signal having a high proportion of noise in order to reduce a possibility of an unauthorized tapping of the pulse position modulated signal; and a second station, connected to the first station using an optical link, including a receiver which receives the pulse position modulated signal transmitted by the first station, wherein an error probability at the second station which is a legal receiver is $$P(E) \leq [1-(1-p)^n]2^{-(n-k)},$$

where p is a bit error probability, n is a code length, and n–k is a number of parity bits in the code, and wherein a probability that an unauthorized receiver will be able to obtain information out of a tapped signal is $$P(C) = \sum_{i=0}^{j} \binom{n}{i} (e)^i (1-e)^{n-i}$$

where j is a maximum number of incorrectly received symbols, which can be corrected using coding and e is a probability of errors in transmission for the unauthorized receiver.

4. A system according to claim 3, wherein:

the first station includes a coder which codes information to be transmitted; and the second station includes a decoder which decodes the coded information to determine if the information is properly received and a transmitter which requests the first station to retransmit the information when the information is not properly received.

\* \* \* \* \*